United States Patent [19]

Stevens

[11] 4,263,684
[45] Apr. 28, 1981

[54] OBSERVATION HIVE

[76] Inventor: John A. Stevens, 238 Kennedy Ave., Schererville, Ind. 46375

[21] Appl. No.: 101,193

[22] Filed: Dec. 7, 1979

[51] Int. Cl.³ ............................................. A01K 47/00
[52] U.S. Cl. ............................................................ 6/1
[58] Field of Search .................................................. 6/1

[56] References Cited

U.S. PATENT DOCUMENTS

| | | | |
|---|---|---|---|
| 2,103,066 | 12/1937 | Engelbrektsson | 6/1 |
| 2,326,250 | 8/1943 | O'Beirne | 6/1 |
| 3,071,784 | 1/1963 | Kolb | 6/1 X |
| 4,094,026 | 6/1978 | Simone | 6/1 |

*Primary Examiner*—Hugh R. Chamblee

*Attorney, Agent, or Firm*—Vogel, Dithmar, Stotland, Stratman & Levy

[57] ABSTRACT

An observation hive including a main frame containing a standard frame and a shallow frame and having a hinged cover closing the top thereof, the main frame having dovetail grooves on the inside thereof extending from the upper end and terminating at support surfaces spaced from the bottom, the standard frame having support extensions on the upper edge thereof extending into the dovetail grooves and resting upon the support surfaces, spacer blocks shaped complementary in cross section to the dovetail grooves and disposed therein and resting upon the support surfaces and supporting extensions on the shallow frame that extend into the dovetail grooves and overlie the spacer blocks, and spacers on the under side of the cover which when the cover is closed press against the top of the shallow frame.

13 Claims, 4 Drawing Figures

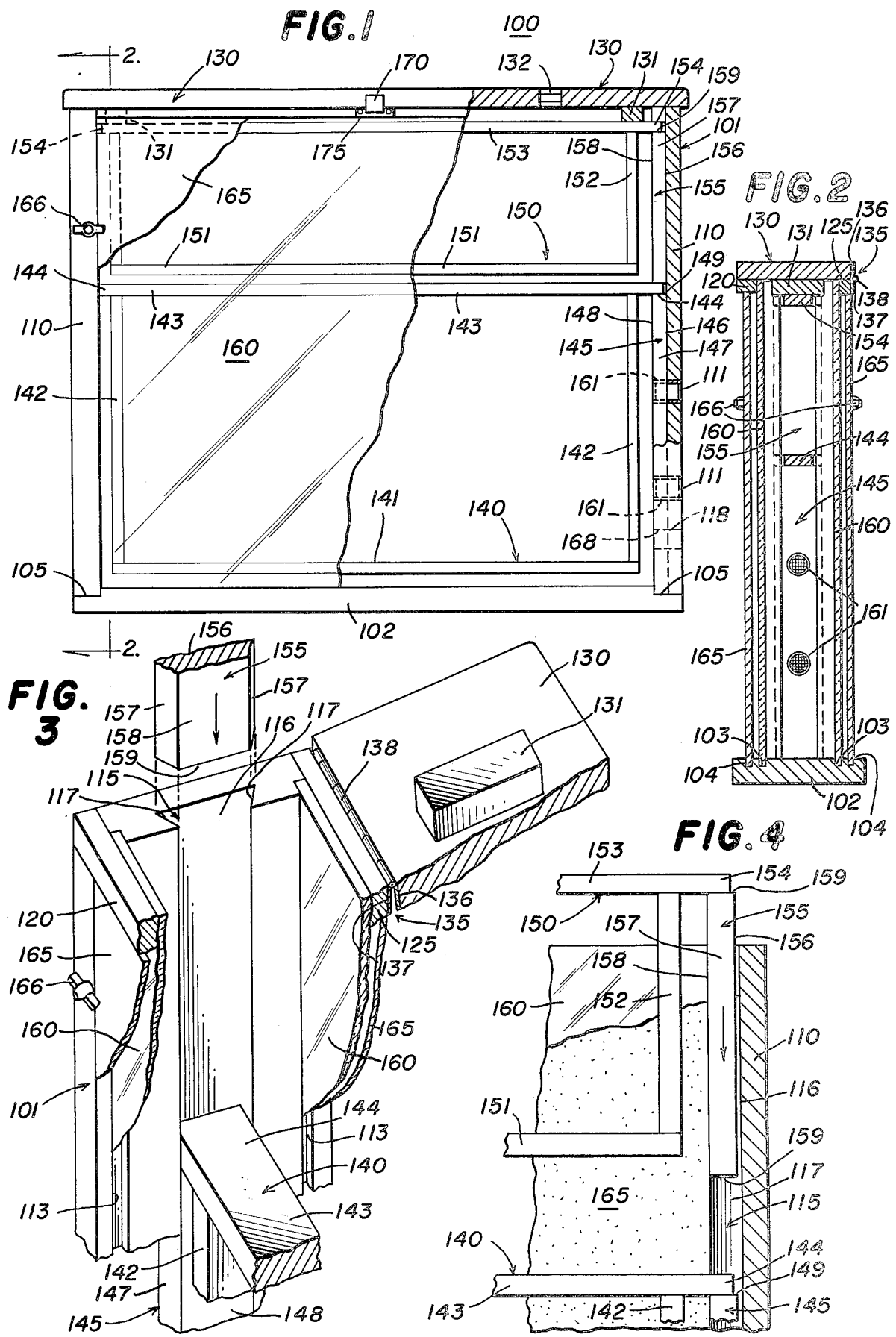

4,263,684

OBSERVATION HIVE

PRIOR ART STATEMENT AND BACKGROUND OF THE INVENTION

The present invention relates to improvements in observation hives, and particularly to an observation hive wherein the standard frame and the shallow frame are more firmly mounted and held during the use of the observation hive.

An observation hive is typically a thin upstanding box with a generally vertical observation window providing a view of a colony of honey bees living and working within the box. It is difficult to maintain a permanent colony of honey bees in an observation hive, and the observation hive is generally constructed only to observe the honey bee life cycle.

Honey bees can be tempermental and ordinarily work in fully enclosed darkened spaces, whereby the provision of a window for observation of the working of the honey bees introduces a disturbing influence into their lives. It therefore is desirable to eliminate any other disturbing influence from the observation hive, and to this end the present invention provides an observation hive is more solidly built with the parts closely and snugly fitting and held firmly in their operative positions during the use thereof to house working honey bees. This is accomplished in a large part by the provision of a dovetail construction for mounting a standard frame and a shallow frame in the usual superimposed positions within the observation hive, and thereafter holding these frames in the working positions by contacting the same with parts of the cover for the observation hive which is latched in position and in turn holds the standard frame and the shallow frame snugly in the working positions thereof. The thus secured frames will not strike the adjacent glass plates covering the sides of the hive, thus providing an important safety feature.

The observation hive of the present invention also incorporates therein "bee space" which makes the bees more comfortable. "Bee space" refers to the provision of a space surrounding the individual frames on the order of at least $\frac{1}{4}''$ to about $\frac{3}{8}''$, a space which is too large to be filled and sealed in the normal occupancy of the hive by the bees, but which is too small to encourage the building of extra comb. Also, there are provided two opaque hardboard shields which can be selectively mounted and demounted, the hardboard shields when mounted serving to darken the interior of the observation hive, thus encouraging bee activity, and the removal of one or both of the hardboard shields accommodating viewing of the observation hive from either side thereof. The provision of the hardboard shields also eliminates the danger of breaking the observation glass when transporting the observation hive, thus providing a significant safety feature.

U.S. Pat. No. 1,211,587 granted Jan. 9, 1917 to J. W. Jordan shows horizontally arranged dovetail grooves for hanging hive frames by top members, but there is no suggestion of using such a construction to position a frame vertically in an observation hive. U.S. Pat. No. 2,103,066 granted Dec. 21, 1937 to E. Engelbrektsson shows spacers on a cover for a bee hive but does not show the dovetail mounting at the sides of the frames.

Permanently mounted side cleats for support of hive frames are shown in U.S. Pat. No. 181,753 granted Aug. 29, 1876 to G. H. Wiley, U.S. Pat. No. 736,226 granted Aug. 11, 1903 to F. Danzenbaker, and U.S. Pat. No. 1,048,950 granted Dec. 31, 1912 to F. Danzenbaker. The use of dovetail construction in parts of a bee hive other than those for hanging the frames are shown in U.S. Pat. No. 2,150,067 granted Mar. 7, 1939 to W. T. Kelley, U.S. Pat. No. 2,717,432 granted Sept. 13, 1955 to J. E. Willard, U.S. Pat. No. 3,088,135 granted May 7, 1963 to W. Z. Covington, and U.S. Pat. No. 3,806,969 granted Apr. 30, 1974 to E. O. Varama.

Typical prior art observation hives for honey bees are illustrated in U.S. Pat. No. Re. 22,044 granted Mar. 3, 1942 to D. E. O'Beirne, U.S. Pat. No. 3,071,784 granted Jan. 8, 1963 to H. S. Kolb, U.S. Pat. No. 3,088,134 granted May 7, 1963 to V. R. Abel, and U.S. Pat. No. 4,094,026 granted June 13, 1978 to D. J. Simoni, but none of these prior observation hives incorporate therein the improved standard frame and shallow frame mounting system of the present invention.

BRIEF SUMMARY OF THE INVENTION

The present invention provides an observation hive for honey bees which more snugly mounts and maintains the standard frame and the shallow frame, and which includes removable safety side shields for the glass sides, thus to eliminate distraction and interference with the life of the honey bees within the observation hive which might result from shaking or rattling of the frames within the observation hive.

This is accomplished in the present invention, and it is an object of the present invention to accomplish these desired results, by providing an observation hive that includes a main frame having a bottom main frame member and two opposed side frame members and two spaced-apart top main frame members, a dovetail groove in each of the side frame members extending from the upper ends thereof downwardly and terminating at support surfaces spaced from the bottom main frame member, a standard frame removably mounted within the main frame in the lower portion thereof and having first support extensions thereon extending into the adjacent dovetail groove and resting upon the adjacent support surface, a pair of spacer blocks for the dovetail grooves shaped complementary thereto in cross section and each disposed in one of the dovetail grooves fitting snugly therein and resting upon the adjacent first support extension, a shallow frame removably mounted within the main frame in the upper portion thereof and having second support extensions thereon extending into the adjacent dovetail groove and resting upon the upper end of the adjacent spacer blocks, and a cover mounted on the main frame adjacent to the upper end thereof and movable to a position overlying and closing the upper end of the main frame and urging the second support extension against the adjacent spacer blocks and in turn urging the spacer blocks against the adjacent first support extensions and in turn urging the first support extensions against the adjacent support surfaces, thereby firmly to mount the standard frame and the shallow frame within the main frame and with respect to each other.

Another object of the invention is to provide an observation hive of the type set forth wherein the first support extensions at the upper end of the standard frame and the second support extensions are at the upper end of the shallow frame, the spacer blocks being attached to the second support extensions for movement therewith.

Yet another object of the invention is to provide an observation hive of the type set forth wherein the cover is hinged to the main frame and a latch and keeper are provided between the cover and the main frame to secure the cover in the closed position thereof.

A further object of the invention is to provide an observation hive of the type set forth wherein the cover carries on the inner surface thereof spacers that bear against the shallow frame in order to hold the shallow frame and standard frame firmly against each other and firmly with respect to the main frame.

Further features of the invention pertain to the particular arrangement of the parts of the observation hive, whereby the above outlined and additional operating features thereof are attained.

The invention, both as to its organization and method of operation, together with further features and advantages thereof will best be understood with reference to the following specification taken in connection with the accompanying drawing.

BRIEF DESCRIPTION OF THE DRAWING

FIG. 1 is an elevational view with certain parts broken away of an observation hive made in accordance with and embodying the principles of the present invention;

FIG. 2 is a view in vertical section along the line 2—2 through the observation hive of FIG. 1;

FIG. 3 is a fragmentary perspective view with certain portions broken away illustrating the construction of the spacer blocks and the associated dovetail grooves and the manner of utilizing the same snugly to mount the standard frame and the shallow frame within the observation hive; and FIG. 4 is a fragmentary elevational view with certain parts broken away illustrating the mounting of the shallow frame in the observation hive.

DETAILED DESCRIPTION OF THE PREFERRED EMBODIMENT

Referring to FIG. 1 of the drawing, it will be seen that the observation hive generally designated by the numeral 100 and made in accordance with and embodying the principles of the present invention includes a generally rectangular main frame 101 within which are mounted a standard frame 140 and a shallow frame 150, a cover 130 on the main frame 101 serving to hold the standard frame 140 and the shallow frame 150 in the proper operative positions within the observation hive 100. Glass plates 160 cover the front and rear of the main frame 101 so that an observer can watch a colony of honey bees within the observation hive 100 from either side thereof, and generally opaque fiberboard shields 165 can be installed to close the sides of the main frame 101.

The main frame 101 includes a bottom frame member 102, two side frame members 110, a top front frame member 120 and a top rear frame member 125. The bottom frame member 102 extends the width of the observation hive 100 and also extends the depth thereof and is provided with two inner grooves 103 that cooperate with and receive the glass plates 160 and has two outer grooves 104 that cooperate with and receive the shields 165. Recesses 105 are formed in the ends of the bottom frame member 102 to cooperate with and receive therein the side frame members 110, respectively, the side frame members 110 being secured to the bottom frame member 102 by fasteners (not shown). The lower portions of the side frame members 110 have openings therein with screens thereover to provide screened air vents 111, two such air vents being shown in each of the side frame members 110. The air vents 111 provide for the necessary ventilation of the honey bee colony within the observation hive 100 during the functioning of the honey bee colony. Each of the side frame members 110 also has two grooves 113 therein that cooperate with and receive one of the vertical edges of the glass plates 160. An important feature of the present invention is the provision of the dovetail groove 115 extending vertically along the entire length of each of the side frame members 110. Each of the dovetail grooves 115 includes an outer wall 116 and a pair of coverging side walls 117.

The top front frame member 120 and interconnects the upper ends of the side frame members 110 at the front of the observation hive 100 (see FIG. 3 particularly), and the top rear frame member 125 interconnects the side frame members 110 at the top thereof and to the rear thereof, the frame members 120 and 125 defining an opening therebetween through which access is had to the interior of the main frame 101. The cover 130 is rectangular in shape and is adapted to cover the entire upper end of the main frame 101 and to extend slightly beyond the outer surfaces of the side frame members 110, see FIG. 1, and also to extend forward slightly beyond the top front frame member 120, see FIG. 2. A piano-type hinge 135 mounts the cover 130 on the upper end of the main frame 101, and specifically to the top rear frame member 125 and the upper ends of the side frame members 110 (see FIG. 3). The piano hinge 135 includes a first hinge plate 136 suitably secured by fasteners (not shown) to the cover 130 and a second hinge plate 167 secured by fasteners (not shown) to the top rear frame member 125 and the side frame members 110, the usual hinge pin 138 interconnecting the two hinge plates 136 and 137. Mounted on the inner surface of the cover 130 are two spacers 131 that are generally rectangular in shape and are spaced inwardly so as to contact the shallow frame 150 adjacent to the ends thereof as is best illustrated in FIG. 1. and as will be discussed more fully hereinafter.

Disposed in the lower portion of the main frame 101 is a standard frame 140 which supports a foundation (not shown) on which a honeycomb may be built. The standard frame 140 includes a bottom frame member 141, two side frame members 142 extending upwardly from the bottom frame member 141 and essentially parallel to each other, and a top frame member 143 interconnecting the side frame members 142, the various frame members mentioned cooperating to form an essentially rectangular standard frame. The top frame member 143 has outwardly extending ends 144 which are used to hang the standard frame 140 within the main frame 101. More specifically, the lower portions of the dovetail grooves 115 in the side frame members 110 have disposed therein respectively spacer blocks 145, each of the spacer blocks 145 in cross section being shaped complementary to the associated dovetail groove 115 and including an outer wall 146, two converging side walls 147 and an inner wall 148. The upper end 149 of each of the spacer blocks 145 provides a support surface for supporting the laterally extending ends 144 on the standard frame 140, thus to mount and support the standard frame 140 upon the spacer blocks 145, the extending ends 144 extending into the associated dovetail groove 115 in the adjacent side frame member 110.

Disposed above the standard frame 140 in the main frame 101 is a shallow frame 150 that is also generally rectangular in shape, and which also is adapted to support a foundation (not shown) on which a honeycomb may be built. The shallow frame 150 includes a bottom frame member 151 and two upstanding side frame members 152 secured to the ends of the bottom member 151, and a top frame member 153 securing the upper ends of the side frame members 152. The top frame member 153 has laterally extending ends 154 that are utilized to mount the shallow frame 150 within the main frame 101. To this end, two spacer blocks 155 are provided adapted to be disposed respectively in the dovetail grooves 115 on the adjacent side frame member 110. Each of the spacer blocks 155 in cross section is shaped complementary to the associated dovetail grooves and is shaped more specifically to fit snugly therein. Each of the spacer blocks 155 includes an outer wall 156, two converging side walls 157 and an inner wall 158. The lower end 159 of each of the spacer blocks 155 provides a support surface adapted to rest upon the upper surface of the associated extending end 144 on the standard frame 140 and to be supported thereby. The upper end 159 of each of the spacer blocks 155 is preferably secured by fasteners (not shown) to the associated extending end 154 on the shallow frame 150 so that the shallow frame 150 and its accompanying spacers 155 can be lifted and moved as a unit, all as is illustrated in FIG. 4 of the drawing.

As was explained above, the side frame members 110 are provided each with two screened air vents 111. The air vents 111 actually communicate with screened air vents 161 provided in the spacer blocks 145 and disposed in alignment with the screened air vents 111. Four of the screened air vents 161 are provided in total, two in each of the spacer blocks 145. A bee entry hole 118 is also provided in at least one of the side frame members 110 and communicates and is in alignment with a bee entry hole 168 provided in the adjacent spacer block 145. The aligned entry holes 118-168 provide access to the interior of the observation hive 100 for the honey bees working therein and provides an exit from the observation hive 100 when required.

The glass plates 160 that are provided in the front and rear of the observation hive 100 are disposed in the inner grooves 103 in the bottom frame member 102 and the grooves 113 in the side frame members 110. The glass plates 160 fit snugly in the aforementioned grooves and extend upwardly and terminate essentially at the same level as the upper surface of the top frame member 120. Although the preferred material of construction for the transparent plate 160 is glass, other transparent materials, such as plastic, can be used in place thereof. The opaque shields 165 are secured in the inner grooves 104 in the bottom frame member 102. The shields 165 are snugly secured in the aforementioned grooves and the upper ends extend upwardly to essentially the upper surface of the top front and rear frame members 120 and 125. Wing nuts 166 mounted on the side frame member 110 serve to hold the shields 165 in the mounted positions thereof. The preferred material of construction for the opaque shields 165 is fiberboard, but other suitable materials can be substituted therefor. In order to hold the cover 130 in the closed position thereof, a latch 170 is mounted on the front of the cover 130 essentially centrally thereof and cooperates with a keeper 175 mounted on the top front frame member 120 also essentially centrally thereof.

In assembling the observation hive 100, the main frame 101 is arranged essentially vertically resting upon the bottom frame member 102. The glass plates 160 are then inserted into the associated front grooves 103 and 113, and the fiberboard shields 165 are inserted into the associated grooves 104 and the wing nuts 166 turned to the locking positions thereof. It will be understood that the spacer blocks 145 are rigidly secured such as by fasteners (not shown) in the associated dovetail grooves 115 in the side frame members 110. The standard frame 140 is then inserted through the top of the main frame 101, and specifically between the top front frame member 120 and the top rear frame member 125, the cover 130 having been moved to the open position illustrated in FIG. 2 of the drawing. The standard frame 140 is dropped directly into the hive and moved down until the parts are in the positions illustrated in FIGS. 1 and 4, namely, with the extending ends 144 on the top frame member 143 overlying and resting upon the upper end 149 of the associated spacer block 145. The shallow frame 150 is then inserted through the opening between the top front frame member 120 and the top rear frame member 125 and is moved downwardly as indicated by the arrows in FIGS. 3 and 4, the spacer blocks 145 being disposed in the dovetail grooves 115 and ultimately resting upon the upper surface of the extending ends 144 of the top frame member 143 (see FIGS. 1 and 2). It will be understood that the spacer blocks 155 snugly fit within the associated dovetail grooves 115, whereby firmly to mount the shallow frame 150 within the main frame 101.

The standard frame 140 and the shallow frame 150 are held in the mounted positions therein by the cover 130 which is now moved to the closed position thereof illustrated in FIGS. 1 and 2 of the drawing. Closure of the cover 130 places the spacers 131 carried thereby firmly upon the upper surface of the top frame member 153 on the shallow frame 150. More specifically, the spacers 131 push the shallow frame 150 downwardly and the extending ends 154 thereon are therefore pressed firmly against the spacer blocks 155 to urge the lower ends 159 of the spacer blocks 155 firmly against the upper surface of the extending ends 144 on the standard frame 140. The pressing of the spacer blocks 155 against the extending ends 144 in turn firmly press the extending ends 144 downwardly against the upper ends 149 on the spacer blocks 145. Accordingly, closure of the cover 130 firmly locks the standard frame 140 and the shallow frame 150 in the operative position within the main frame 101 and holds those parts against shifting and rattling, which action would be disturbing to a colony of honey bees working within the observation hive 100. In order to hold the cover in the closed position thereof, the latch 170 is engaged by the keeper 175.

It will be seen therefore that the observation hive 100 can be readily assembled, and that after assembly the parts thereof are all firmly held with respct to one another so as to eliminate any rattling or movement therebetween. This is helpful in maintaining a quiet honey bee colony within the observation hive 100. When it is desired to remove the shallow frame 150 and the standard frame 140 from the observation hive, the latch 170 is disengaged from the keeper 175 and the cover 130 is swung to the position illustrated in FIG. 3. The user now can easily lift the shallow frame 150 from the observation hive 100 by grasping the top frame member 153 and pulling directly upwardly. Thereafter, the standard frame 140 can likewise be readily removed from the observation hive 100 by grasping the top frame member 143 and lifting upwardly.

When the observation hive 100 is fully assembled with the cover 130 closed, the proper "bee space" is provided around the standard frame 140 and the shallow frame 150, this space being on the order of $\frac{1}{4}''$ to about $\frac{3}{8}''$. More specifically, there is provided between the side frame member 110 and the adjacent sides 142 and 152 of the frames 140 and 150, respectively, a suitable spacing; there likewise is a suitable "bee space" between the top frame member 143 and the bottom frame member 151 and between the bottom frame member 141 and the bottom frame member 102 and between the top frame member 153 and the cover 130. There also is the necessary and suitable "bee space" between the glass plates 160, and specifically the inner surfaces thereof, and adjacent sides of the main frame 140 and the shallow frame 150. In other words, each of the frames 140 and 150 is completely surrounded by the suitable "bee space". Such a "bee space" is too large to be filled and sealed in the normal occupancy of the hive, but is too small to encourage the building of extra comb.

The secured frames 140 and 160 since they do not move with respect to the main frame 101 will not strike the glass plates 160, thereby to serve as a safety feature during transport of the observation hive 100. When the fiberboard shields 165 are in position, they also serve to protect the glass plates 160 as well as provide a darkened condition for operation of the colony of honey bees within the observation hive 100. By providing the removable shields 165 on both the front and back of the observation hive 100, both or either side of the observation hive 100 can be viewed upon removal of the associated shield 165.

Although certain preferred materials of construction have been discussed above, it will be appreciated that the observation hive 100, and particularly the main frame 101 thereof, can be made all of wood, or can be made all of plastic, or a combination of wood and plastic.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. An observation hive for honey bees and the like comprising a main frame including a bottom main frame member and two opposed side main frame members and two spaced-apart top main frame members, spaced-apart front and rear walls disposed within said main frame, at least one of said walls being transparent, a dovetail groove in each of said side main frame members extending from the upper ends thereof downwardly and terminating at support surfaces spaced from said bottom main frame member, a standard frame removably mounted within said main frame in the lower portion thereof between said walls and having first support extensions thereon, each support extension extending into the adjacent dovetail groove and resting upon the adjacent support surface, a pair of spacer blocks for said dovetail grooves shaped complementary thereto in cross section and each disposed in one of said dovetail grooves fitting snugly therein and resting upon the adjacent first support extension, a shallow frame removably mounted within said main frame in the upper portion thereof between said walls and having second support extensions thereon, each second support extension extending into the adjacent dovetail groove and resting upon the upper end of the adjacent spacer block, said dovetail grooves extending longitudinally the entire length of said shallow frame and being transversely dimensioned for effectively preventing horizontal movement of said standard and shallow frames, a cover mounted on said main frame adjacent to the upper end thereof and movable to a closed position overlying and closing the upper end of said main frame and contacting said shallow frame, and latch means securing said cover in its closed position for urging said second support extensions against the adjacent spacer blocks and in turn urging said spacer blocks against the adjacent first support extensions and in turn urging said first support extensions against the adjacent support surfaces, thereby firmly and immovably to mount said standard frame and said shallow frame within said main frame and with respect to each other.

2. The observation hive set forth in claim 1, wherein said dovetail grooves extend the length of the associated side main frame members and have disposed in the lower portions thereof spacer blocks, the upper ends of said spacer blocks providing said support surfaces.

3. The observation hive set forth in claim 1, wherein said first support extensions are disposed at the upper end of said standard frame.

4. The observation hive set forth in claim 1, wherein said spacer blocks are respectively attached to the associated second support extensions.

5. The observation hive set forth in claim 1, wherein said second support extensions are disposed at the upper end of said shallow frame.

6. The observation hive set forth in claim 1, wherein said cover is hinged to said main frame.

7. The observation hive set forth in claim 6, wherein said cover is attached to said main frame by a piano-type hinge.

8. The observation hive set forth in claim 1, and further comprising air holes in said side main frame members and said cover and having screens covering said air holes.

9. The observation hive set forth in claim 1, and further comprising a bee entry hole in at least one of said side main frame members.

10. The observation hive set forth in claim 1, and further comprising grooves adjacent to the sides of said main frame for receiving said walls therein.

11. The observation hive set forth in claim 1, and further comprising an opaque sheet for covering the transparent one of said walls.

12. The observation hive set forth in claim 11, and further comprising grooves adjacent to the sides of said main frame for receiving said opaque sheet thereon.

13. The observation hive set forth in claim 1, wherein said cover includes spacers thereon disposed inwardly into said main frame for contacting said shallow frame when said cover is disposed in its closed position.

\* \* \* \* \*